United States Patent
Ziems et al.

(10) Patent No.: US 10,726,707 B2
(45) Date of Patent: Jul. 28, 2020

(54) HAZARD DETECTOR AND METHOD FOR TRANSMITTING A HAZARD SIGNAL AND SYSTEM COMPRISING THE HAZARD DETECTOR

(71) Applicant: MINIMAX GMBH & CO. KG, Bad Oldesloe (DE)

(72) Inventors: Bernd Ziems, Zarpen (DE); Hauke Dittmer, Fehmarn (DE); Dirk Siemer, Rethwisch (DE); Axel Grothoff, Neumünster (DE); Peter Zuelzer, Hamburg (DE); Arne Stamer, Siebenbäumen (DE); Pawel Wisniewski, Bad Oldesloe (DE); Bernd Hallwass-Fedder, Hamburg (DE)

(73) Assignee: Minimax GmbH & Co. KG, Bad Oldesloe (DE)

( * ) Notice: Subject to any disclaimer, the term of this patent is extended or adjusted under 35 U.S.C. 154(b) by 0 days.

(21) Appl. No.: 16/308,354

(22) PCT Filed: Apr. 10, 2017

(86) PCT No.: PCT/EP2017/058511
§ 371 (c)(1),
(2) Date: Dec. 7, 2018

(87) PCT Pub. No.: WO2017/211481
PCT Pub. Date: Dec. 14, 2017

(65) Prior Publication Data
US 2019/0139397 A1 May 9, 2019

(30) Foreign Application Priority Data
Jun. 8, 2016 (DE) .................... 10 2016 110 530

(51) Int. Cl.
*G08B 17/00* (2006.01)
*G08B 25/10* (2006.01)
(Continued)

(52) U.S. Cl.
CPC ............. *G08B 25/10* (2013.01); *G08B 17/00* (2013.01); *G08C 17/02* (2013.01); *G08C 23/04* (2013.01); *H04Q 9/00* (2013.01); *H04Q 2209/43* (2013.01)

(58) Field of Classification Search
None
See application file for complete search history.

(56) References Cited

U.S. PATENT DOCUMENTS 5,880,676 A * 3/1999 Tsou .................. A47G 33/0872
340/539.1
6,392,536 B1 5/2002 Tice et al.
(Continued)

FOREIGN PATENT DOCUMENTS

DE 298 14 738 U1 5/1999
DE 299 19 926 U1 3/2000
(Continued)

OTHER PUBLICATIONS

International Preliminary Report on Patentability, International Application No. PCT/EP2017/058511 (pubished under WO 2017/211481), 10 pages (dated Dec. 11, 2018).
(Continued)

*Primary Examiner* — John F Mortell
(74) *Attorney, Agent, or Firm* — Perkins Coie LLP

(57) ABSTRACT

The invention relates to a hazard detector for an evaluation unit (12, 14), e.g. a fire detector and/or extinguishing control center (12). The hazard detector (10) comprises a housing (16) having at least one sensor unit (22) or a sensor interface for connecting the sensor unit (22) to capture a hazard
(Continued)

parameter. Moreover, the hazard detector (10) comprises a first electronic assembly (26), electrically connected to the sensor unit (22) or the sensor interface, for processing sensor signals of the sensor unit (22), and a second electronic assembly (30), connected to at least one first interface (38) for electrically connecting the second electrical assembly (30) to a physically remote evaluation unit (12, 14). In this arrangement, the first electronic assembly (26) and the second electronic assembly (30) comprise a wireless data connection (32) for transmitting the processed sensor signals from at least the first electronic assembly (26) to the second electronic assembly (30). At least the first electronic assembly (26) and the second electronic assembly (30) are arranged inside the housing (16). Further, the invention relates to a method for transmitting hazard signals and to a system having the hazard detector (10).

14 Claims, 2 Drawing Sheets

(51) Int. Cl.
*G08C 17/02* (2006.01)
*G08C 23/04* (2006.01)
*H04Q 9/00* (2006.01)

(56) References Cited

U.S. PATENT DOCUMENTS

| | | | | |
|---|---|---|---|---|
| 6,690,288 | B1* | 2/2004 | Waddell | G08B 7/062 |
| | | | | 340/539.11 |
| 2005/0195088 | A1* | 9/2005 | Solak | G08B 17/10 |
| | | | | 340/628 |
| 2014/0266793 | A1* | 9/2014 | Velado | G08B 25/08 |
| | | | | 340/870.16 |

FOREIGN PATENT DOCUMENTS

| | | |
|---|---|---|
| DE | 202 04 388 U1 | 9/2002 |
| DE | 10 2013 207 990 A1 | 11/2014 |

OTHER PUBLICATIONS

International Search Report (with English translation), International Application No. PCT/EP2017/058511 (pubished under WO 2017/211481), 8 pages (dated Jun. 22, 2017).

* cited by examiner

HAZARD DETECTOR AND METHOD FOR TRANSMITTING A HAZARD SIGNAL AND SYSTEM COMPRISING THE HAZARD DETECTOR

PRIORITY CLAIM AND INCORPORATION BY REFERENCE

This application is a 35 U.S.C. § 371 application of International Application No. PCT/EP2017/058511, filed Apr. 10, 2017, which claims the benefit of German Application No. 10 2016 110 530.9 filed Jun. 8, 2016, each of which is incorporated by reference in its entirety.

TECHNICAL FIELD

The invention relates to the field of hazard detectors that, coupled to evaluation units, such as, for example, fire detector and/or extinguishing control centers, are used for constantly monitoring buildings and/or objects.

BACKGROUND AND SUMMARY OF THE INVENTION

According to the prior art, hazard detectors have an interface by means of which the hazard detector is preferably connectable to a single fire detector and/or extinguishing control center. After the hazard detector responds or is triggered on the basis of an event, such as, for example, a fire, an event report is then sent from the hazard detector to a fire detector control center of a fire protection system. To this end, the hazard detectors are connected to the fire detector control center via a wire line.

The hazard detector allows one or more follow-up actions to be performed after the arrival of an event report at a fire detector control center about a detected event, for example a fire. An example of a follow-up action of this kind is automatic extinguishing, for example.

The electrical lines for transmitting a detected event are what are known as threshold value based circuits, for example, which can also be referred to as threshold value detector lines or current increase lines. The known threshold value based circuits result in events being reported by virtue of a prescribed constant voltage, for example 9 volts, being made available for the circuit by the fire detector and/or extinguishing control center, for example. The circuit comprises a two-wire line, for example, the two lines having a constant voltage applied to them at one end by the fire detector and/or extinguishing control center. At the other end of the two-wire lines, the two lines are connected to one another by means of a terminating resistor. On account of the terminating resistor, a predefined, substantially constant current flows through the circuit.

The hazard detectors are now connected in parallel with the terminating resistor, for example, each hazard detector having a current sink, for example a switchable internal resistance, and, in an event situation, connecting this internal resistance to the circuit such that the total current measured by the fire detector and/or extinguishing control center at the input of the circuit increases.

By detecting this current increase in the fire detector and/or extinguishing control center, it is now possible to infer an event, which means that said event can be reacted to by the fire detector and/or extinguishing control center in a suitable manner.

As a result of the advancing automation in buildings, however, there is ever more frequently the desire to connect a hazard detector that is present anyway to not just one evaluation unit, such as a fire detector and/or extinguishing control center, in order to use the sensor data. Rather, it is thus desirable to also electrically connect the hazard detector to further evaluation units besides the fire detector and/or extinguishing control center. Examples of such further evaluation units are further fire detector control centers of a third-party supplier different than the hazard detector manufacturer, building management systems or even further units, such as further modules of the same fire detector and/or extinguishing control center, for example in order to use different connections of the hazard detector to the same fire detector and/or extinguishing control center to interchange different signals between the hazard detector and the fire detector and/or extinguishing control center.

In this case, however, the problem arises that, if, by way of example, an evaluation unit retrieves data from a hazard detector for which signals are transmitted to the hazard detector or from the hazard detector to the evaluation unit in the form of voltage or current variations, a further evaluation unit connected to the hazard detector could already interpret the variations as an event and then trigger an alarm. Even if, by way of example, different interfaces were provided for two different evaluation units, the actuating of the hazard detector via the one interface would mean that current flows are produced in the hazard detector that could be the result of a potential equalization between the interfaces, for example. In this case too, there would then be the risk that such currents would also be measurable at the further interface, which means that they would be detected as an event by the further evaluation unit and could therefore result in false alarms.

Against this background, the invention was based on the object of specifying a hazard detector that overcomes the disadvantages found in the prior art to the greatest possible extent. It is thus an object of the present invention to find a hazard detector and a method for transmitting a hazard signal that allows multiple evaluation units to be electrically connected to a single hazard detector.

To achieve this object, the invention comprises a hazard detector for an evaluation unit. The evaluation unit is a fire detector and/or extinguishing control center, for example. The hazard detector is a combustion gas or fume detector, a heat detector, a smoke detector, a spark detector or a flame detector, for example. The hazard detector is also a detector for thermal decomposition processes, for example.

The hazard detector comprises a housing and at least one sensor unit or a sensor interface for connecting the sensor unit. The sensor unit is used for capturing a hazard parameter, which is a fire parameter, for example. A fire parameter is an increased ambient temperature or an increased amount of smoke particles, for example.

The sensor unit or the sensor interface further has a first electronic assembly electrically connected to it. The first electronic assembly is used for processing sensor signals of the sensor unit. These sensor signals are accordingly representative of a hazard parameter, for example. The electrical connection to the sensor unit or the sensor interface is accordingly used to transmit the hazard parameter captured using the sensor unit to the first electronic assembly as a sensor signal.

Moreover, the invention comprises a second electronic assembly and a first interface. The first interface and the second electronic assembly are electrically connected to one another. The first interface is used for electrical connection to a physically remote evaluation unit. Accordingly, the connection of the second electronic assembly to the first interface is therefore used for indirectly connecting the physically remote evaluation unit to the second electronic assembly.

Further, the first electronic assembly and the second electronic assembly have a wireless data connection for transmitting the processed sensor signals from at least the first electronic assembly to the second electronic assembly. At least the first electronic assembly and the second electronic assembly are arranged inside the housing.

According to the invention, a hazard variable is accordingly detected using a sensor unit of the hazard detector or using a sensor unit connected to a sensor interface of the hazard detector. The sensor signals of the sensor unit are then processed using a first electronic assembly of the hazard detector, which electronic assembly is electrically connected to the sensor unit. A processing comprises an analog-to-digital conversion and/or a boosting of the signals, for example. The processed sensor signals are then transmitted from the first electronic assembly to a second electronic assembly of the hazard detector inside the housing of the hazard detector using a wireless data connection. The second electronic assembly transmits the processed sensor signals, which have previously been transmitted wirelessly, by means of a first interface, which is electrically connected to the second electronic assembly, to a physically remote evaluation unit. The evaluation unit, which is a fire detector control center, for example, can then initiate follow-up measures in a fire situation.

The wireless data connection allows signals to be output on the first interface for electrical connection to a physically remote evaluation unit independently of the potentials representing the sensor signals or the processed sensor signals.

According to a first advantageous embodiment, the first electronic assembly and the second electronic assembly are DC isolated from one another. That is to say that the two assemblies have no electrically conductive connection at all.

According to a further embodiment, the first electronic assembly is configured to receive sensor signals obtained from the sensor unit or the sensor interface, which can also be referred to as hazard signals. The first electronic assembly is then configured to interpret these sensor signals or hazard signals for the existence of an alarm situation. Further, the first electronic assembly is configured so as, if an alarm situation exists, to generate an alarm signal representative of the alarm situation.

Overall, the hazard detector is thus configured to transmit the alarm signal via the wireless data connection to the second electronic assembly and from the second electronic assembly via the first interface to an evaluation unit. Accordingly, the hazard signal is thus first of all interpreted for the existence of an alarm situation using the first electronic assembly. Accordingly, the first electronic assembly has already provided an indicator allowing the existence of an alarm situation to be recalled or detected by means of an alarm signal. As provided for according to this exemplary embodiment, this alarm signal can be transmitted to the second electronic assembly and hence to the first interface via the wireless connection.

The transmitting of a representative alarm signal instead of the sensor signal per se allows a robust wireless data transmission, since only a small volume of data is necessary in order to transmit either the existence of an alarm situation or the existence of no alarm situation in the form of the alarm signal. By contrast, if the sensor signals, in particular the raw sensor signals, were transmitted via the wireless data connection without the preprocessing using the first electronic assembly, then high data transmission rates would be necessary. These high data transmission rates would not be compatible with the requirements of high interference immunity, as are desired and frequently stipulated for security devices.

According to a further embodiment, the evaluation unit is a physically remote fire detector and/or extinguishing control center, a programmable logic controller, a building management system or an actuator of an extinguishing installation. Such an actuator is a solenoid valve, for example.

According to a further embodiment, the wireless data connection comprises a first and a second transceiver. In this arrangement, the first electronic assembly comprises the first transceiver and the second electronic assembly comprises the second transceiver. By way of example, the first and second transceivers are each optical transceivers, such as, for example, IrDA transceivers. Alternatively, the first and second transceivers are radio transceivers, such as, for example, Bluetooth or NFC transceivers.

An advantage of a wireless data connection in the form of transceivers is a bidirectional communication between the first and second electronic assemblies. Accordingly, the wireless data connection can be used not only to transmit alarm signals from the first electronic assembly to the second electronic assembly, but status query signals, for example, can also be transmitted in the opposite direction from the second electronic assembly to the first electronic assembly.

The use of IrDA transceivers, Bluetooth or NFC transceivers is advantageous because they are standardized in large numbers and are thus available particularly cheaply. This allows cheap production of the hazard detector per se.

According to a further embodiment, the wireless data connection is configured to interchange data with a third transceiver arranged outside the housing. By way of example, it is thus possible to bring an external device having this third transceiver into the area of the housing and to interchange data with the first electronic assembly and/or the second electronic assembly. An advantage in this case is that the wireless data connection that already exists can be used to perform service operations at the hazard detector, such as, for example, calibration or installation following startup, in a simple manner using an external device.

In this case, it is naturally possible for the third transceiver likewise to be an optical transceiver or a radio transceiver. In the case of an optical transceiver, the housing of the hazard detector has an optically transmissive area for optical connection of the third transceiver to the first and second transceivers.

According to a further advantageous embodiment, the first electronic assembly is connected to a second interface directly or indirectly. The second interface is configured to supply the first electronic assembly and additionally or alternatively the sensor unit with power for operation.

According to this embodiment, the second interface is additionally or alternatively configured to set up a data connection to the evaluation unit or a further evaluation unit.

Accordingly, a second interface connected to the first electronic assembly is thus provided according to this embodiment. This interface is accordingly used merely for supplying power, or alternatively for data connection to the evaluation unit or a further evaluation unit or for supplying power and for data connection. The first and second interfaces are accordingly connected to one another by the wireless data connection of the first and second electronic assemblies, the supply of electricity and/or a data interchange with the electronic assemblies each being effected via a separate interface. Electrical signal alterations on either the first or the second interface accordingly cannot result in signal alterations on the other of the two interfaces on account of unwanted potential equalization currents.

According to a further advantageous embodiment, the housing has a housing upper part and a housing lower part. The housing upper part and the housing lower part are detachably connectable to one another. At least the first electronic assembly is mechanically connectable or connected to the housing upper part and at least the second electronic assembly is mechanically connectable or connected to the housing lower part.

This connection holds the two assemblies securely in the housing, the first electronic assembly being mechanically connected only to the housing upper part and the second electronic assembly being mechanically connected only to the housing lower part. This allows the housing to be easily opened.

Electrical connections between the first and second electronic assemblies have accordingly been dispensed with, which means that it is not necessary for any electrical connections between the first and second housing upper parts to be broken when the housing is opened. The separate replacement of the housing upper part or the housing lower part for a hazard detector in the event of a fault, for example in the upper part or in the lower part, is therefore easily possible.

According to a further embodiment, the housing lower part comprises the second interface, the second interface being in the form of a power supply and signal distribution apparatus, preferably in the form of a terminal strip. The second electronic assembly is in the form of a relay module and/or an interface module. Additionally or alternatively, the second electronic assembly is a relay module, a communication module and/or an interface module having the first interface.

Moreover, the invention relates to a system having at least one hazard detector according to one of the aforementioned embodiments and having an evaluation unit, which is a remote fire detector and/or extinguishing control center, a programmable logic controller, a building management system or an actuator of an extinguishing installation.

BRIEF DESCRIPTION OF THE DRAWINGS

Further embodiments of the invention are obtained on the basis of the exemplary embodiments described in more detail in the drawings, in which.

MODE(S) FOR CARRYING OUT THE INVENTION

Figure 1:
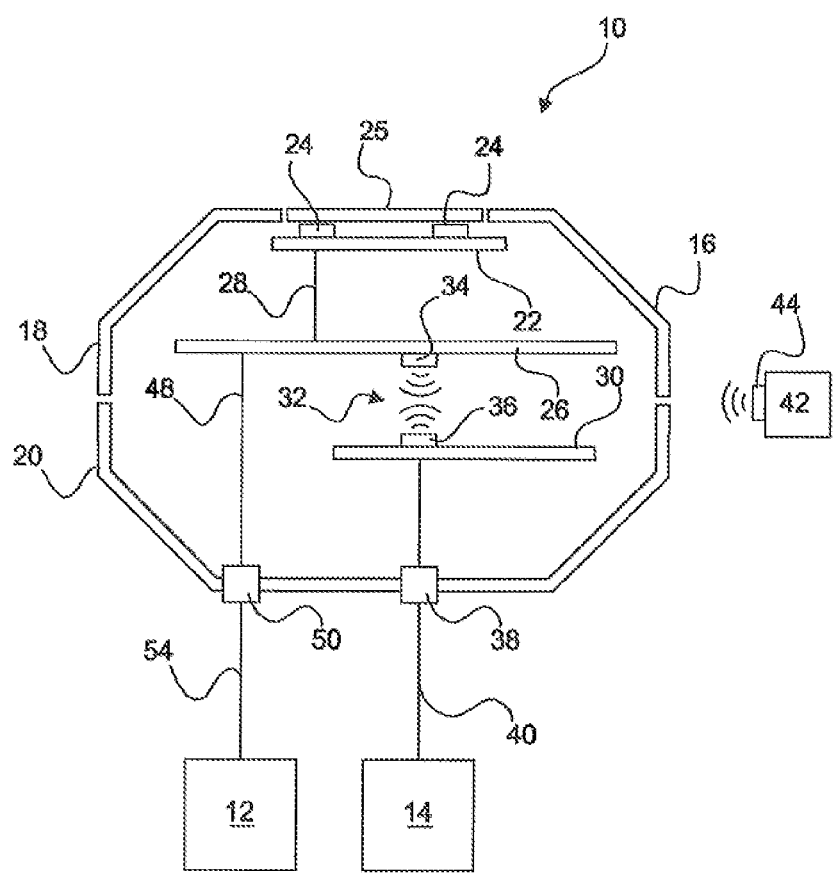
FIG. 1 shows a first exemplary embodiment of a hazard detector.

FIG. 1 shows a hazard detector 10 connected to a fire detector and/or extinguishing control center 12 and to a programmable logic controller 14. The fire detector and/or extinguishing control center 12 and the programmable logic controller 14 can also be referred to as evaluation units 12, 14.

The hazard detector 10 has a housing 16 comprising a housing upper part 18 and a housing lower part 20. Arranged inside the housing 16 is a sensor unit 22 having two sensors 24. The sensors 24 are arranged close to the edge of the housing upper part 18, an at least partially transmissive area 25 being provided in the housing upper part 18 in the area of the sensors 24. This transmissive area 25 is consistent with a grid, for example, in order to let through fire parameters, such as, for example, gases or particles in the ambient air, to the sensors 24.

The sensor unit 22 having the sensors 24 is connected to a first electronic assembly 26 via an electrical connection 28. The first electronic assembly 26 receives sensor signals, which are hazard signals SG, for example. The hazard signals SG or sensor signals are generated by the sensor unit 22 on the basis of the surroundings of the sensors 24. The first electronic assembly 26 interprets these hazard signals SG for the existence of an alarm situation. That is to say that, by way of example, an alarm situation is assumed in the event of predefined hazard signals SG, whereas hazard signals SG that are not consistent with the predefined hazard signals SG are interpreted as a non-alarm situation.

When an alarm situation exists, an alarm signal SA representative of the alarm situation is generated and this alarm signal SA is transmitted to a second electronic assembly 30. For this purpose, the second electronic assembly 30 is connected to the first electronic assembly 26 via a wireless data connection 32. The wireless data connection 32 comprises a first transceiver 34 and a second transceiver 36. In this arrangement, the first transceiver 34 is part of the first electronic assembly 26 or at least connected to the first electronic assembly 26. The second transceiver 36 is part of the second electronic assembly 30 or at least electrically connected to the second electronic assembly 30.

First of all, the alarm signal SA is thus sent or transmitted via the wireless data connection 32 and then the alarm signal SA is sent or transmitted onward to a first interface 38, to which the programmable logic controller 14 is connected via a connection 40. The programmable logic controller 14 is accordingly thus connected to the second electronic assembly 30 via the electrical connection 40 and the interface 38. The alarm signal SA is thus transmitted to the programmable logic controller in the event of an alarm, which means that the programmable logic controller can react to the alarm signal SA.

Further, a service device 42 is depicted that has a third transceiver 44. The service device 42 can likewise interchange data with the first transceiver 34 or the second transceiver 36 via the third transceiver 44. Accordingly, status reports from the hazard detector 10 are retrievable via the service device 42, for example. Additionally or alternatively, the service device 42 is used for programming the hazard detector 10 via the third transceiver 44, which is used to transmit the commands to be programmed to the first transceiver 34 and/or the second transceiver 36.

The first electronic assembly 26 is moreover connected to a second interface 50 via a further electrical connection 48. The second interface 50 is connected to a fire detector and/or extinguishing control center 12 via an electrical connection 54. The connection of the first electronic assembly 26 to the fire detector and/or extinguishing control center 12 via the second interface 50 also allows transmission of the alarm signal SA generated in the first electronic assembly 26 to the fire detector and/or extinguishing control center 12. Moreover, the fire detector and/or extinguishing control center supplies the first electronic assembly 26 with power via the electrical connections 48, 54 and the second interface 50. The electrical connection 28 furthermore forwards the power to the sensor unit 22. The wireless data connection 32 allows complete DC isolation of the fire detector and/or extinguishing control center 12 from the programmable logic controller 14, which means that they can operate at different voltages or currents, for example. Potential differences of the different evaluation units 12, 14 on the interfaces 38, 50 accordingly do not result in voltage equalization currents between the electronic assemblies 26, 30 inside the hazard detector 10 that can be interpreted as an alarm signal SA on one of the interfaces 50 or 38, for example, even though an alarm signal SA has not actually been generated by the first electronic assembly 26.

Figure 2:
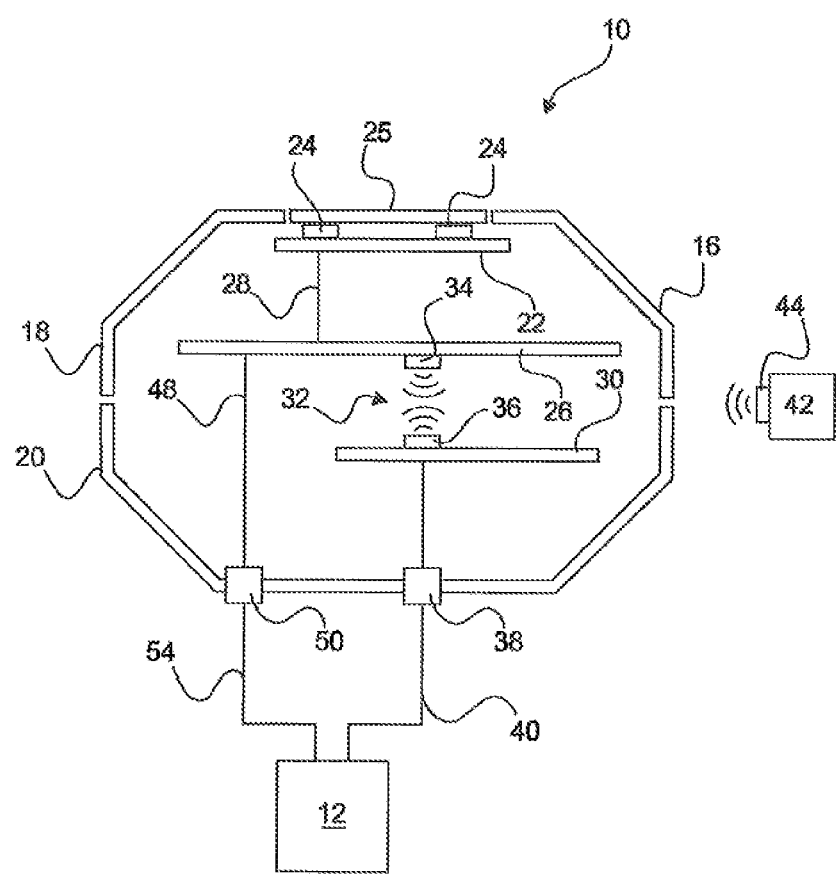
FIG. 2 shows a further exemplary embodiment of the hazard detector.

FIG. 2 shows the same design of the hazard detector 10 as FIG. 1. Therefore, the same reference signs also denote the same features in the figures.

In FIG. 2, however, the two interfaces 50, 38, namely the first interface 50 and the second interface 38, are each connected to the same fire detector and/or extinguishing control center 12 via an electrical connection 54, 40. In this arrangement, the two interfaces 50, 38 are connected to different modules of the fire detector and/or extinguishing control center 12 via the corresponding electrical connections 54, 40, however. For a better overview, these modules are not depicted individually, however.

In this exemplary embodiment, it is conceivable that one of the modules monitors only a voltage or a current on one of the interfaces 38, 50, in particular on the first interface 38, and, in the event of a changing current or a changing voltage, interprets this change as an alarm signal SA. The further module of the fire detector and/or extinguishing control center 12 is then a module that can communicate with the other interface 38, 50, in particular the second interface 50, via digital signals and can therefore firstly receive a digital alarm signal SA and can secondly retrieve further information from the hazard detector 10 selectively, for example as a result of a request from a user. Further information is status reports from the hazard detector 10, for example.

Additionally, the digital electrical connection 54 can also be used to program the hazard detector 10 during installation, for example. In this case, the invention makes it possible to ensure that programming or the retrieval of the status via the one interface, for example the second interface 50, does not influence the signals of the other interface, for example the first interface 38. Accordingly, there is no risk of the data interchange with the hazard detector 10 inadvertently resulting in a signal that is consistent with an alarm signal SA for the alarm situation, for example, arising in the hazard detector and being output via the first interface 38. The risk of false triggering, that is to say a false alarm in the fire detector and/or extinguishing control center 12, is therefore countered.

LIST OF UTILIZED REFERENCE NUMBERS

10 Hazard detector
12 Fire detector and/or extinguishing control unit
12, 14 Evaluation unit
14 Programmable logic controller
16 Housing
18 Housing upper part
20 Housing lower part
22 Sensor unit
24 Sensor
25 Transmissive area
26 First electronic assembly
28 Connection
30 Second electronic assembly
32 Wireless data connection
34 First transceiver
36 Second transceiver
38 First interface
40 Connection
42 Service device
44 Third transceiver
46 Power supply and signal distribution apparatus
48 Connection
50 Second interface
52 Connection
54 Connection
SA Alarm signal
SG Hazard signal

The invention claimed is:

1. A hazard detector for an evaluation unit of a fire detector and/or extinguishing control center, comprising:
a housing,
at least one sensor unit or a sensor interface for connecting the sensor unit to capture a hazard parameter including a fire parameter,
a first electronic assembly, electrically connected to the sensor unit or the sensor interface, for processing sensor signals of the sensor unit, and
a second electronic assembly, connected to at least one first interface for electrically connecting the second electrical assembly to a physically remote evaluation unit,
wherein the first electronic assembly and the second electronic assembly comprise a wireless data connection for transmitting the processed sensor signals from at least the first electronic assembly to the second electronic assembly, and at least the first electronic assembly and the second electronic assembly are arranged inside the housing, and
wherein the first electronic assembly is connected to a second interface directly or indirectly, the second interface being configured to supply the first electronic assembly and/or the sensor unit with power for operation and/or to set up a data connection to the evaluation unit or a further evaluation unit.

2. The hazard detector as claimed in claim 1, wherein the first electronic assembly and the second electronic assembly are DC isolated from one another.

3. The hazard detector as claimed in claim 1, wherein the first electronic assembly is configured to receive sensor signals obtained from the sensor unit or the sensor interface, which are in particular hazard signals, to interpret said sensor signals for the existence of an alarm situation and, if an alarm situation exists, to generate an alarm signal representative of the alarm situation, the hazard detector being configured to transmit the alarm signal via the wireless data connection to the second electronic assembly and from the second electronic assembly via the first interface to an evaluation unit.

4. The hazard detector as claimed in claim 1, wherein the evaluation unit is at least one of: a remote fire detector and/or extinguishing control center, a programmable logic controller, a building management system or an actuator of an extinguishing installation.

5. The hazard detector as claimed in claim 1, wherein the wireless data connection comprises a first transceiver and a second transceiver, and the first electronic assembly comprises the first transceiver and the second electronic assembly comprises the second transceiver, and the first transceiver and the second transceiver are optical transceivers or radio transceivers.

6. The hazard detector as claimed in claim 5, wherein the wireless data connection is configured to interchange data with a third transceiver arrangeable outside the housing.

7. The hazard detector as claimed in claim 1, wherein the housing has a housing upper part and a housing lower part detachably connectable to one another, at least the first electronic assembly being mechanically connected to the housing upper part and at least the second electronic assembly being mechanically connected to the lower housing part.

8. The hazard detector as claimed in claim 7, wherein the housing lower part comprises the second interface and the second interface is in the form of a power supply and signal distribution apparatus including a terminal strip, and/or the second electronic assembly is in the form of a relay module, a communication module and/or an interface module, and/or the second electronic assembly has a relay module, a communication module and/or an interface module having the first interface.

9. A method for transmitting a hazard signal to an evaluation unit, comprising the steps of:
  detecting a hazard parameter including a fire parameter, using at least one sensor unit of a hazard detector or a sensor unit connected to a sensor interface of the hazard detector,
  processing sensor signals of the sensor unit using a first electronic assembly of the hazard detector, which assembly is electrically connected to the sensor unit,
  transmitting the processed sensor signals using a wireless data connection from at least the first electronic assembly to a second electronic assembly of the hazard detector inside a housing of the hazard detector,
  transmitting the processed sensor signals from the second electronic assembly by a first interface of the hazard detector to a physically remote evaluation unit, and
  supplying the first electronic assembly and/or the sensor unit with power and/or setting up a data connection to the evaluation unit or a further evaluation unit by a second interface.

10. The method as claimed in claim 9, wherein the first electronic assembly receives sensor signals, which are in particular hazard signals, from the sensor unit, interprets said sensor signals for the existence of an alarm situation and, if an alarm situation exists, generates an alarm signal representative of the alarm situation, the hazard detector transmitting the alarm signal via the wireless data connection to the second electronic assembly and from the second electronic assembly via the first interface to the evaluation unit.

11. The method as claimed in claim 10, wherein the wireless data connection comprises a first transceiver and a second transceiver, the first electronic assembly comprising the first transceiver and the second electronic assembly comprising the second transceiver, and the first transceiver and the second transceiver transmitting data from the first transceiver to the second transceiver or from the second transceiver to the first transceiver.

12. The method as claimed in claim 11, wherein the wireless data connection interchanges data with a third transceiver arrangeable in particular outside the housing.

13. The method as claimed in claim 12, wherein the housing has a housing upper part and a housing lower part and the housing upper part is detached from the housing lower part or the housing upper part is detachably connected to the housing lower part.

14. A system having at least one hazard detector as claimed in claim 1 and an evaluation unit that is a remote fire detector and/or extinguishing control center, a programmable logic controller, a building management system or an actuator of an extinguishing installation.

* * * * *